US010021996B2

United States Patent
Cantwell et al.

(10) Patent No.: US 10,021,996 B2
(45) Date of Patent: Jul. 17, 2018

(54) END CAP FOR VARIABLE DISPLAY CONFIGURATIONS

(71) Applicant: Mid-West Metal Products Co., Inc., Muncie, IN (US)

(72) Inventors: Brad Cantwell, Muncie, IN (US); Stew Kerr, Muncie, IN (US); Michael E. Greene, Muncie, IN (US); Terrance L. Jones, Muncie, IN (US)

(*) Notice: Subject to any disclaimer, the term of this patent is extended or adjusted under 35 U.S.C. 154(b) by 61 days.

(21) Appl. No.: 14/613,588

(22) Filed: Feb. 4, 2015

(65) Prior Publication Data

US 2015/0230632 A1    Aug. 20, 2015

Related U.S. Application Data

(60) Provisional application No. 61/940,535, filed on Feb. 17, 2014.

(51) Int. Cl.
*A47B 43/00*    (2006.01)
*A47B 47/00*    (2006.01)
(Continued)

(52) U.S. Cl.
CPC .............. *A47F 7/30* (2013.01); *A01K 1/0353* (2013.01); *A47F 5/0006* (2013.01); *A47F 5/08* (2013.01);
(Continued)

(58) Field of Classification Search
CPC ....... A01K 1/0353; A47F 7/30; A47F 5/0006; A47F 5/10; A47F 5/103; A47F 5/08;
(Continued)

(56) References Cited

U.S. PATENT DOCUMENTS 2,087,149 A * 7/1937 Hendrix ................. A47G 25/02
                                                        211/162
D134,111 S * 10/1942 Bersin et al. ................... 211/45
(Continued)

FOREIGN PATENT DOCUMENTS

FR        2647327 A1    11/1990

OTHER PUBLICATIONS

European Search Report; dated Jun. 24, 2015; 6 pages; Issued by the European Patent Office.

*Primary Examiner* — Jennifer E Novosad
(74) *Attorney, Agent, or Firm* — Taft Stettinius & Hollister LLP; Stephen F. Frost (57) ABSTRACT

An end cap assembly includes a base member, a back member, and a first and second support members coupled to the back member. The first support member is disposed at one side of the back member and the second support member is disposed at an opposite side. A plurality of extension members is removably coupled to the first and second support members. The assembly also includes a first spacer member, a second spacer member, and a cross member coupled at one end to the first or second spacer member. An intermediate member is coupled to the cross member at an end opposite either the first or second spacer member. The assembly includes a support rod coupled at one end to the intermediate member and at an opposite end to the first or second spacer member. A plurality of couplers is coupled to the support rod.

16 Claims, 11 Drawing Sheets

(51) Int. Cl.
  *A47B 57/00* (2006.01)
  *A47F 5/08* (2006.01)
  *A47H 13/00* (2006.01)
  *A47F 7/30* (2006.01)
  *A47F 5/00* (2006.01)
  *A47F 5/10* (2006.01)
  *A01K 1/035* (2006.01)

(52) U.S. Cl.
  CPC .............. *A47F 5/0876* (2013.01); *A47F 5/10* (2013.01); *A47F 5/103* (2013.01)

(58) Field of Classification Search
  CPC .......... A47F 5/0876; A47F 5/101; A47F 7/24; A47F 7/26; A47F 7/19; A47B 96/067; A47B 96/06; A47B 96/061; A47B 57/42; A47B 61/003; A47B 61/02; A47G 25/06; A47G 25/0664; A47G 25/0671; A47G 25/0678; A47G 25/0685; A47G 25/32; A47G 25/28; A47G 25/743; A47G 25/26; A47G 25/30; A47G 25/1442; A47G 25/38; A47G 25/50; A47G 25/74; A47G 25/1414; A47G 25/34; A47G 29/00
  USPC ...... 211/206, 204, 103, 193, 87.01, 45, 189, 211/85.3, 124, 89.01; 118/500; D6/315–328, 552, 553, 566, 567, 569, D6/570, 571, 572, 672, 675.2, 678.4, D6/682.6; 223/85–98
  See application file for complete search history.

(56) References Cited

U.S. PATENT DOCUMENTS

| | | | | |
|---|---|---|---|---|
| 3,184,068 A * | 5/1965 | Wende | A47F 7/04 | 108/107 |
| D216,548 S * | 2/1970 | James | | D6/320 |
| 3,779,394 A * | 12/1973 | Bard | A47F 5/103 | 211/134 |
| 3,782,558 A * | 1/1974 | Schael, Jr. | A47F 7/0028 | 211/13.1 |
| 4,256,043 A * | 3/1981 | Ovitz, III | A47F 7/163 | 108/29 |
| 4,316,547 A * | 2/1982 | Varon | A47G 25/0692 | 211/105.1 |
| 4,501,369 A * | 2/1985 | Fox | A47B 57/26 | 108/147.12 |
| 4,634,010 A * | 1/1987 | Otema | A47F 7/24 | 211/103 |
| 4,884,702 A * | 12/1989 | Rekow | A47F 5/083 | 211/106 |
| 5,303,830 A * | 4/1994 | Metcalf | A47F 5/0807 | 211/103 |
| 5,472,103 A * | 12/1995 | Merl | A47B 47/022 | 211/187 |
| 5,499,727 A * | 3/1996 | Koch | A47F 7/005 | 211/103 |
| 5,509,541 A * | 4/1996 | Merl | A47B 45/00 | 211/103 |
| 5,526,941 A * | 6/1996 | Ford | A47F 5/0876 | 211/103 |
| 5,590,940 A * | 1/1997 | Richard | A47B 81/00 | 211/162 |
| 5,645,178 A * | 7/1997 | Conley, Jr. | A47F 5/08 | 211/87.01 |
| 5,649,631 A * | 7/1997 | Loflin | A47F 7/175 | 211/168 |
| 5,738,019 A * | 4/1998 | Parker | A47B 46/00 | 108/108 |
| 5,918,750 A * | 7/1999 | Jackson | A47F 5/0807 | 108/108 |
| 5,944,203 A * | 8/1999 | Vlah | A47F 5/0846 | 211/189 |
| 6,082,560 A * | 7/2000 | Timm | A47B 57/10 | 108/152 |
| 6,161,708 A * | 12/2000 | Myler | A47F 5/0031 | 211/106 |
| 6,739,463 B2 * | 5/2004 | Wishart | A47B 47/027 | 211/175 |
| 6,786,340 B2 * | 9/2004 | Ford | A47F 5/0815 | 211/103 |
| 6,848,589 B2 * | 2/2005 | Wood | A47B 91/00 | 211/189 |
| 7,237,687 B1 * | 7/2007 | Abdi | A47G 25/0685 | 211/119.004 |
| 7,624,880 B2 * | 12/2009 | Kin | A47F 5/137 | 211/45 |
| 7,900,783 B2 * | 3/2011 | Fernandez | A47B 45/00 | 108/108 |
| 8,061,539 B2 * | 11/2011 | Punzel | A47B 47/021 | 108/108 |
| 9,468,312 B2 * | 10/2016 | Denby | A47F 5/0043 | |
| D773,856 S * | 12/2016 | Cantwell | | D6/569 |
| 2001/0050262 A1 * | 12/2001 | LaBruna Jr. | A47F 5/103 | 211/87.01 |
| 2005/0145147 A1 * | 7/2005 | Costa | A47B 47/022 | 108/108 |
| 2006/0076304 A1 * | 4/2006 | Kainuma | A47F 3/00 | 211/90.01 |
| 2006/0091092 A1 | 5/2006 | Vosbikian | | |
| 2006/0237382 A1 * | 10/2006 | Sarnoff | A47F 5/083 | 211/106 |
| 2007/0241072 A1 * | 10/2007 | Bryant | A47B 96/021 | 211/90.02 |
| 2007/0267375 A1 * | 11/2007 | Battaglia | A47B 47/03 | 211/189 |
| 2008/0023418 A1 * | 1/2008 | Robbins | A47F 5/0807 | 211/45 |
| 2015/0076312 A1 * | 3/2015 | Angvall | A47F 5/0081 | 248/469 |
| 2015/0230632 A1 * | 8/2015 | Cantwell | A47F 7/30 | 119/28.5 |

\* cited by examiner

END CAP FOR VARIABLE DISPLAY CONFIGURATIONS

RELATED APPLICATIONS

This application claims priority to U.S. Provisional Patent Application Ser. No. 61/940,535, filed Feb. 17, 2014, which is hereby incorporated by reference in its entirety.

FIELD OF THE DISCLOSURE

The present disclosure relates to an end cap to a commercial shelving system that is capable of displaying pet beds.

BACKGROUND

It is common practice for commercial and retail stores to use large shelving units to display the products that are sold. The shelving units often consist of a strong center member or wall that goes along the length of the aisle. The center member can act as a base for connecting many various shelving attachments. The shelving attachments are used to create a flat surface to set products on top of. Further, a hook or rail structure can be used to provide a means for hanging products on display from the center member.

The center member or wall must be adequately supported to prevent the center member from falling into the aisle. This is usually achieved by having a strong base section that provides support to the wall. The center member is also usually supported at the ends of the aisles by a second wall that is perpendicular to the center member. This second wall is often as wide as a longitudinal cross section of the shelving system and provides for additional support to keep the center member from becoming unstable.

In addition to providing needed support to the center member, the second wall is also an ideal space for displaying products. The second wall creates more exposure for a product than would the shelves along the center member because shoppers often walk along the exterior of the aisles prior to choosing an aisle that may contain the product they are looking for. From a marketing standpoint, displaying products on the second wall is ideal because it increases the exposure of the product to the customer.

With regards to animal beds or other similar products, using shelving along the aisle is not ideal. The animal beds are often too large to easily fit on the shelves. While the animal beds may be organized in an aesthetically pleasing fashion when the store opens, after consumers begin to remove the animal beds from the shelves they can become disorganized and hard to view. The current method of displaying animal beds is not ideal because it reduces the consumer's exposure to the animal bed by locating it on shelves within the aisles and it often results in a messy product display as consumers rummage through the various animal bed products.

SUMMARY

In one embodiment of the present disclosure, an end cap assembly includes a base member adapted to rest on a floor surface; a back member including a height and a width; a first support member and a second support member coupled to the back member, the first support member disposed at one side of the back member and the second support member disposed at an opposite side thereof; a plurality of extension members removably coupled to the first and second support members; a first spacer member and a second spacer member, the first spacer member being coupled to at least two of the plurality of extension members and the second spacer member being coupled to at least two other of the plurality of extension members; a cross member coupled at one end to at least one of the first or second spacer member; an intermediate member coupled to the cross member at an end opposite either the first or second spacer member, the intermediate member being disposed substantially parallel to the first and second spacer members; at least one support rod coupled at one end to the intermediate member and at an opposite end thereof to one of the first spacer member and second spacer member; and a plurality of couplers coupled to the at least one support rod, wherein the plurality of couplers are configured to support one or more articles for display on the end cap display.

In one example of this embodiment, each of the plurality of extension members includes a first end and a second end, the first end being coupled to either the first spacer member or second spacer member, and the second end including a coupler end for coupling to the first support member or the second support member. In a second example, the first and second support members include a plurality of openings defined along their respective lengths, where each of the plurality of extension members are coupled to the first or second support member via at least one of the plurality of openings. In a third example, the first support member and the second support member include a longitudinally defined groove for receiving the back member.

In a fourth example, the assembly includes a second intermediate member, a second cross member, and a second support rod. The second cross member is coupled between the second intermediate member and the second spacer member, and the second rod member is coupled between the second intermediate member and the second spacer member at a location beneath the second cross member. In a fifth example, the assembly includes a plurality of reinforcement members. Each of the plurality of reinforcement members is disposed within one end of each of the plurality of extension members. In a sixth example, the plurality of extension members includes a first extension member, a second extension member, a third extension member, and a fourth extension member. The first extension member and the second extension member are spaced from one another and coupled to the first support member and the first spacer member to form a first four-sided rail structure. The third extension member and the fourth extension member are spaced from one another and coupled to the second support member and the second spacer member to form a second four-sided rail structure. In a seventh example, the plurality of couplers comprises a hook, hanger, or double hook.

In a different embodiment, an animal bed end cap display assembly includes a base member adapted to rest on a floor surface; a back member including a height and a width and disposed upright with respect to the base member; a first support member and a second support member coupled to the back member, the first support member coupled along one side of the back member and the second support member coupled along an opposite side thereof; a plurality of extension members removably coupled to the first and second support members, wherein each of the plurality of extension members extends in a direction away from the back member; a first spacer member and a second spacer member, the first spacer member being coupled to at least two of the plurality of extension members and the second spacer member being coupled to at least two other of the plurality of extension members; a cross member coupled at one end to the first spacer member and at an opposite end to the second spacer member, wherein the cross member has a length approximate the width of the back member; an intermediate member coupled to the cross member at a location between the first and second spacer members; a first support rod coupled at one end to the intermediate member and at an opposite end to the first spacer member; and a second support rod coupled at one end to the intermediate member and at an opposite end to the second spacer member; wherein, the first support rod is spaced from and disposed at a location beneath the cross member, and the second support rod is spaced from and disposed at a location beneath the cross member.

In one example of this embodiment, a third support rod is coupled to the intermediate member, the third support rod being disposed substantially parallel to the first support rod and the second support rod. In a second example, the assembly includes a fourth support rod coupled to 3rd support rod and the cross member, the fourth support rod including a bent end for coupling to the cross member and a curled end forming a loophole for receiving the third support rod. In a third example, the assembly includes a first animal bed, a second animal bed, and a third animal bed, the first animal bed being larger than the second animal bed and the second animal bed being larger than the third animal bed, wherein the first animal bed is supported by the second support rod, the second animal bed is supported by the third support rod, and the third animal bed is supported by the first support rod.

In a fourth example, the assembly includes a support hook having a curled end and a bent end, wherein the bent end is removably coupled to the cross member and the curled end forms a loophole for receiving the first support rod or second support rod. In a fifth example, the plurality of extension members includes a first extension member, a second extension member, a third extension member, and a fourth extension member. The first extension member and the second extension member are spaced from one another and coupled to the first support member and the first spacer member to form a first four-sided structure, and the third extension member and the fourth extension member are spaced from one another and coupled to the second support member and the second spacer member to form a second four-sided structure. In a sixth example, the assembly includes a plurality of couplers coupled to the first and second support rods, wherein the plurality of couplers are configured to support one or more articles for display on the end cap display.

In a seventh example, the plurality of couplers comprises a hook, hanger, or double hook. In an eighth example, each of the plurality of extension members includes a first end and a second end, the first end being coupled to either the first spacer member or second spacer member, and the second end including a coupler end for coupling to the first support member or the second support member. In a ninth example, the first and second support members comprise a plurality of openings defined along their respective lengths, where each of the plurality of extension members are coupled to the first or second support member via at least one of the plurality of openings. In a tenth example, the first support member and the second support member include a longitudinally defined groove for receiving the back member. In a further example, the assembly includes a plurality of reinforcement members, wherein each of the plurality of reinforcement members is disposed within one end of each of the plurality of extension members.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
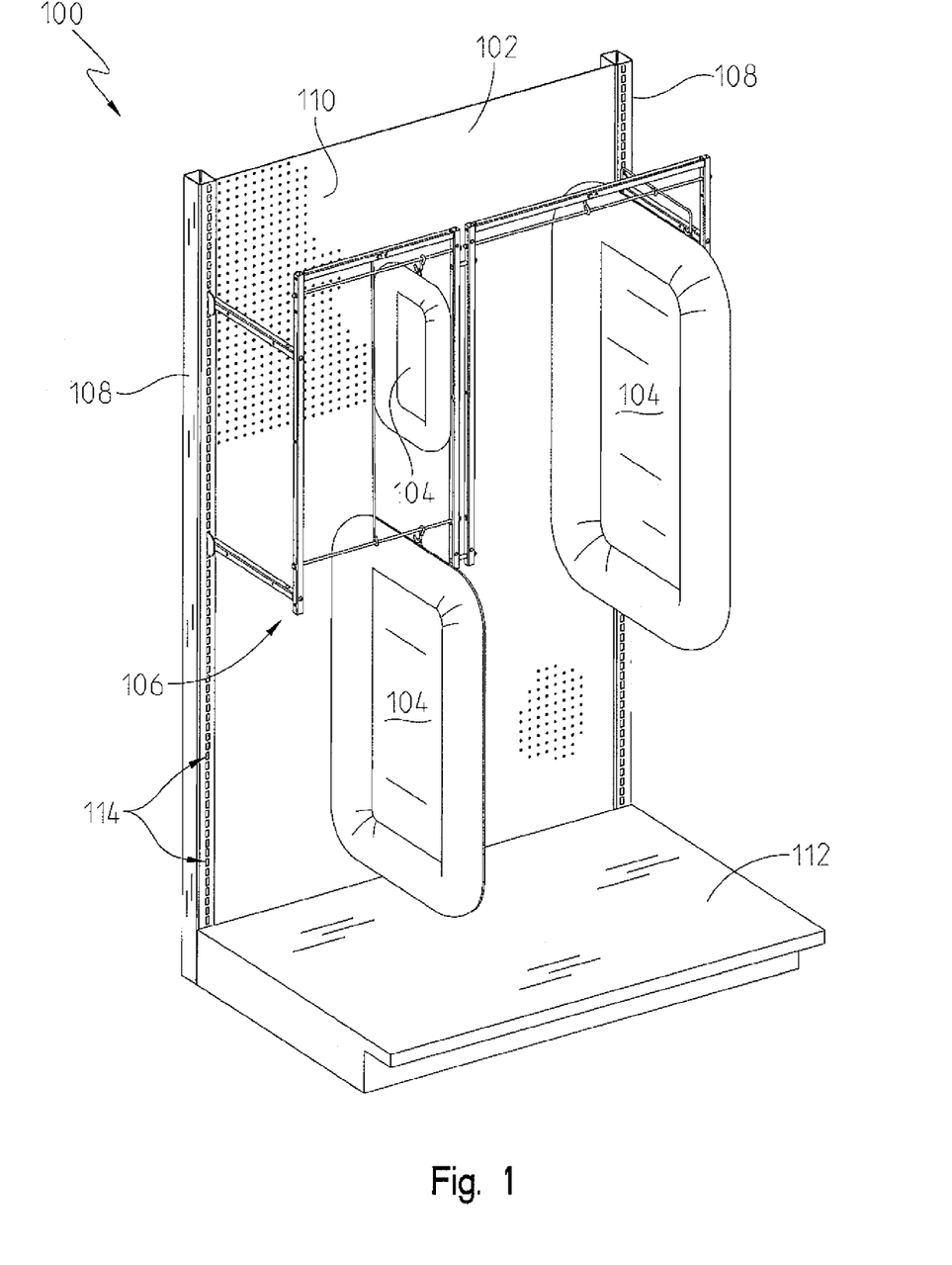
FIG. 1 is a perspective view of a first embodiment of an animal bed display end cap for displaying animal beds.

Referring to FIG. 1, one embodiment of an end cap assembly 100 is shown. The assembly 100 includes an end cap 102 that may be used to display pet beds 104 or other articles in a retail store. For example, a retail store may have one or more aisles displaying any number of items for sale. At the end of each aisle may be an end cap similar to the one shown in FIG. 1. Alternatively, the end cap 102 may be positioned along an aisle for displaying any number of articles for sale.

In the embodiment of FIG. 1, the end cap 102 may include a rail structure 106 and at least one support member 108. As shown, the support member 108 may be disposed substantially vertically with respect to a ground surface such that the support member 108 has a length that defines an approximate height of the end cap assembly 100. The rail structure 106 may be removably coupled to the support member 108 at any desired location along the length thereof. As such, a plurality of openings or notches 114 may be defined in the support member 108 to accommodate the coupling of the rail structure 106 thereto. This is further described below.

The end cap 102 may also include a back member 110. The back member 110 can be sized to include a height and width. The height and width of the back member 110 may be approximately the same height and width as the end cap 102.

In one example, the end cap 102 may be approximately 36" wide. In another example, the end cap 102 may be approximately 48" wide. In any event, the present disclosure does not intend to limit the width of the end cap 102.

The back member 110 may be plate formed of a plastic, wood, metal or any other material. The back member 110 may also include a plurality of holes defined therein. The plurality of holes may be used to couple hooks, rods, or other coupling devices to the back member 110. For example, the plurality of holes can provide a means for coupling a plurality of different types of display hardware (not shown) to the end cap 102. The at least one support member 108 may include a groove or slot which the back member 110 may be disposed in its upright position of FIG. 1.

Figure 11:
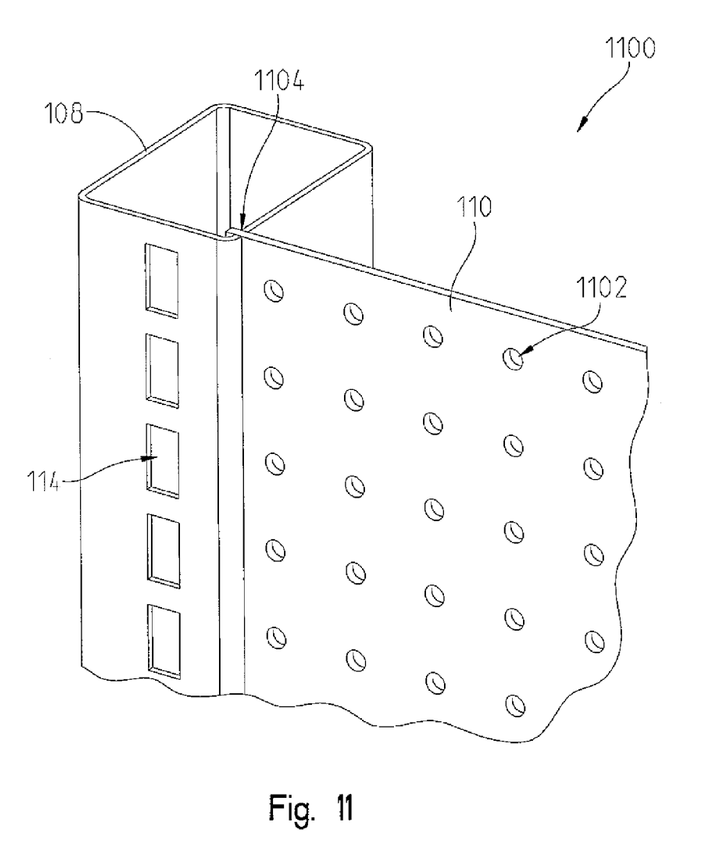
FIG. 11 is a partial perspective view of a support member and back member.

In FIG. 11, for example, one embodiment 1100 of a back member 110 is shown including a plurality of holes 1102 defined therein. Hangers, hooks, or other structure may be coupled to the back member 110 via one or more of the plurality of holes 1102. The at least one support member 108 is also shown as being formed by four sidewalls. In one of the sidewalls is a plurality of openings or notches 114 defined therein. The rail structure 106 may be coupled to the support member 108 via one or more of the plurality of openings or notches 114. As also shown, a groove or slot 1104 is defined in another of the sidewalls closest to the back member 110. As such, the groove or slot 1104 may be sized for receiving the back wall 110. The back wall 110 may be removably coupled to the support member 108 by disposing the back wall 110 in the groove or slot 1104. The groove or slot 1104 may extend from a top surface of the sidewall to a bottom surface thereof. Alternatively, there may be two or more grooves or slots 1104 defined in the sidewall, and the back wall 110 may include two or more fingers (not shown) for engaging each of the two or more grooves or slots 1104. In any event, the back wall 110 may be coupled to the support member 108.

The end cap 102 may be supported in part by a base member 112. The base member 112 may rest on a ground surface (not shown). The at least one support member 108 may be substantially perpendicular to the base member 112. In at least one embodiment, the at least one support member 108 may be removably coupled at its lower end to the base member 112. As such, the support member 108 may be coupled to both the back member 110 and base member 112 to form part of the end cap 102. Moreover, the base member 112 can provide additional stability to the support member 108.

Figure 2:
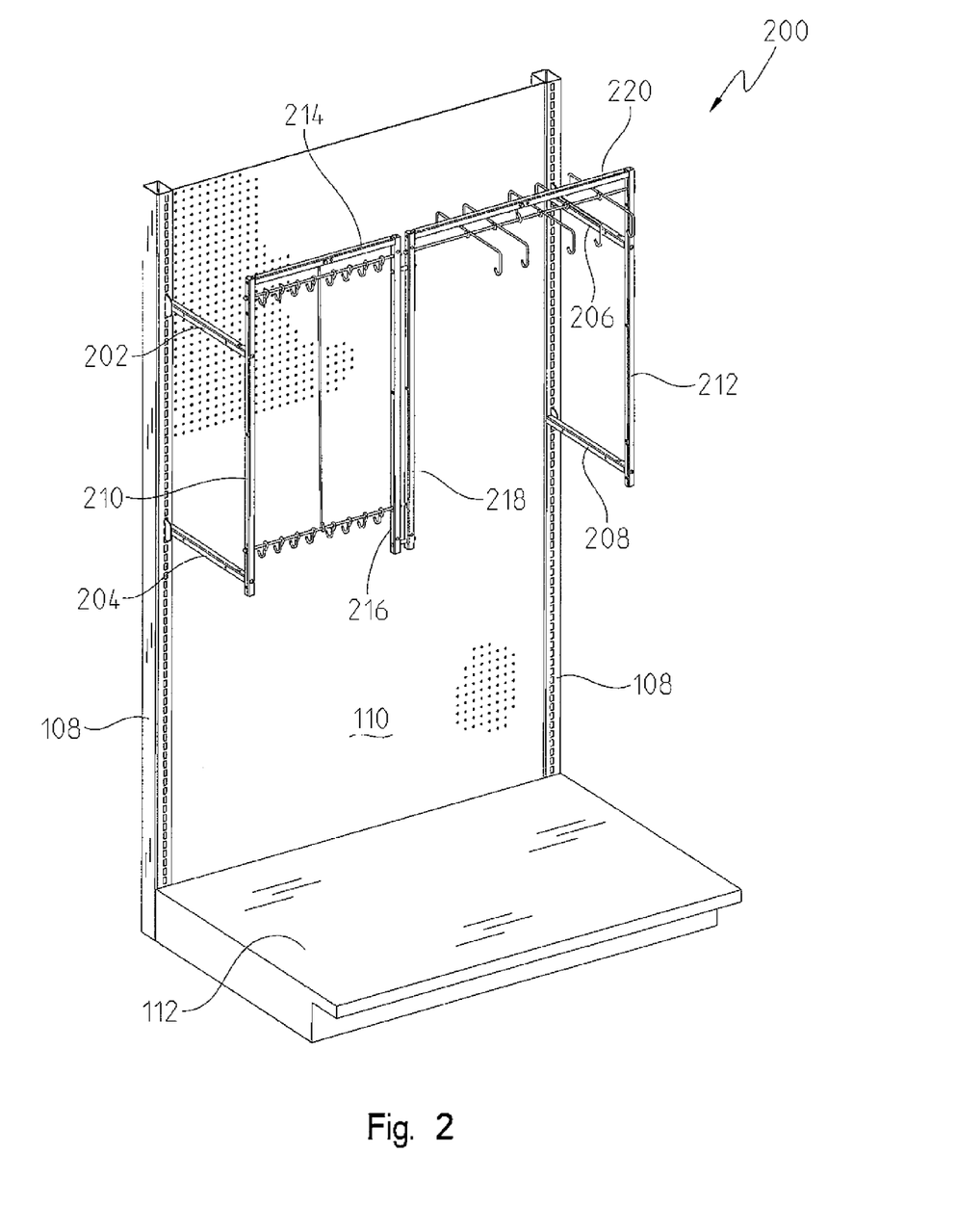
FIG. 2 is another perspective view of the end cap of FIG. 1.

In FIG. 2, another embodiment of an end cap assembly 200 is shown. Here, the end cap 102 is shown not supporting any pet beds 104 or other articles for sale. More particularly, in FIG. 2, the rail structure 106 is shown in greater detail and how it can be coupled to and extend outwardly from a pair of support members 108. The rail structure 106 may be formed by a plurality of extension members. In the embodiment of FIG. 2, the plurality of extension members includes first extension member 202, second extension member 204, third extension member 206, and fourth extension member 208. The plurality of extension members may be removably coupled to each support member 108. In FIG. 2, the extension members 202, 204, 206, and 208 can be removably coupled to the support member 108 at one end, and removably coupled to a first spacer 210 or a second spacer 212 at the other end. Further, the first extension member 202, the second extension member 204, the first spacer 210, and one of the support members 108 can be substantially coplanar with regards to their spatial orientation. Similarly, the third extension member 206, the fourth extension member 208, the second spacer 212, and the other support member 108 can be substantially coplanar with one another with regards to their spatial orientation. In at least one aspect, the first and second extension members may be parallel to but not coplanar with the third and fourth extension members.

The first spacer 210 and second spacer 212 can be substantially parallel to both support members 108 and the back member 110. The first spacer 210 may also couple to a first cross member 214. The first cross member 214 can be an elongate wire or body that is substantially perpendicular to both the first spacer 210 and the first extension member 202. While the first cross member 214 is removably coupled at one end to the first spacer 210, it can be removably coupled to a first center member 216 at a second end thereof. The first center or intermediate member 216 can be substantially perpendicular to the first cross member 214 and substantially parallel to the first spacer 210. The first center member 216 can also be removably coupled to a second center or intermediate member 218. The second center member 218 can be substantially the same size and length as the first center member 216, although this is not required. Both the first center member 216 and the second center member 218 can provide for a plurality of locations to removably couple additional hardware to achieve different options for displaying products.

The second center member 218 can be coupled to a second cross member 220. The second cross member 220 can be perpendicular to the second center member 218 and extend from the second center member 218 to the second spacer 212. Further, the second cross member 220 can be perpendicular to both the extension member 206 and the second spacer 212. In the illustrative embodiment 200, the support member 108, extension members 202, 204, 206, and 208, the first and second spacer 210, 212, the first and second cross members 214, 220, and the first and second center members 216, 218 can all be removably coupled to one another to provide a substantially rigid structure.

Figure 3:
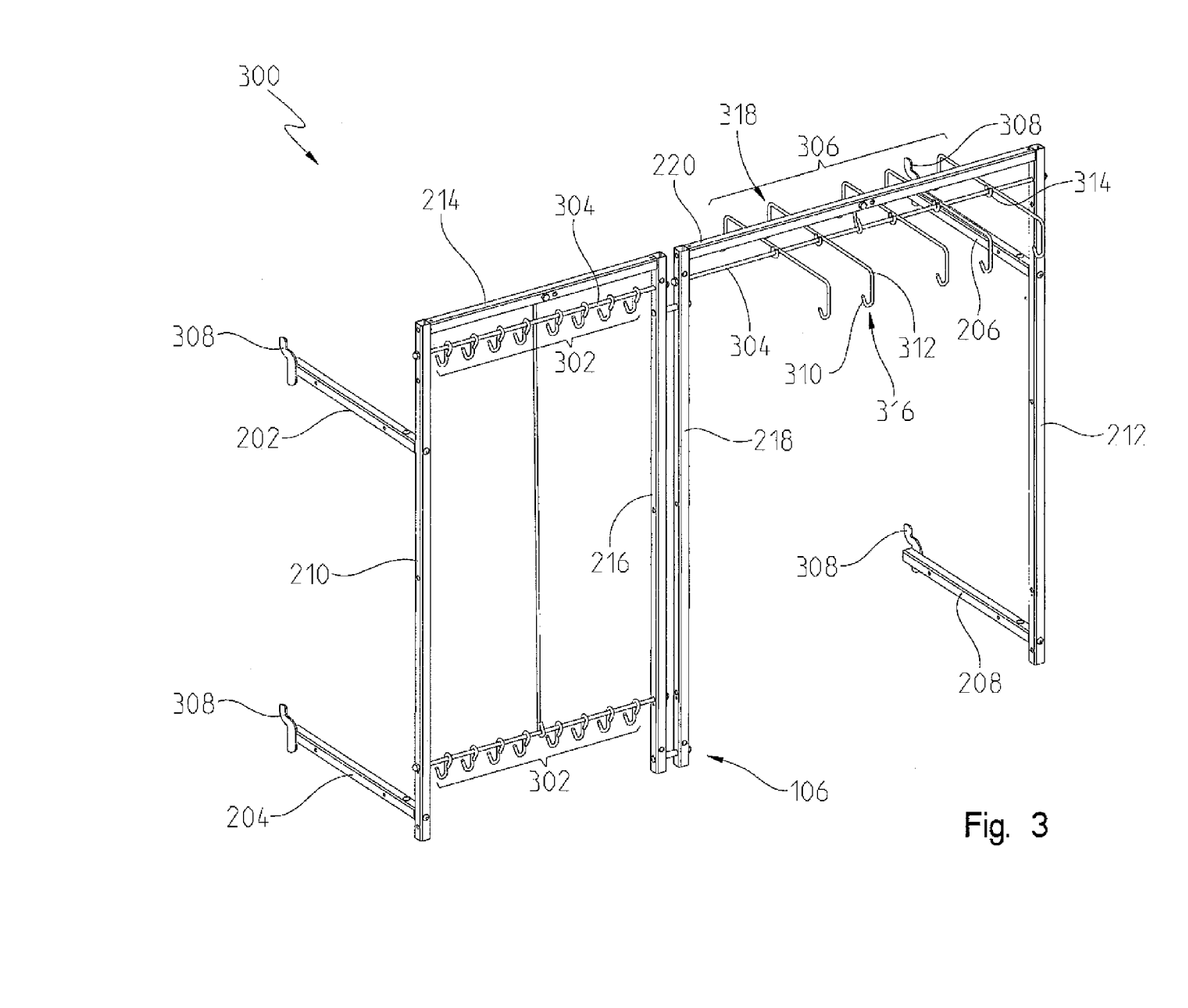
FIG. 3 is a perspective view of a rail and hanger system of the end cap of FIG. 1.

In FIG. 3, a detailed view 300 of the rail structure 106 is shown removed from the support member 108 and separated from the end cap 102. In particular, FIG. 3 shows in more detail one embodiment of a hanger system that can be utilized for displaying products on an end cap 102. The rail structure 106 can include at least one hook 302. The hook 302 can be comprised of a wire having a substantially 360 degree bend at a first end that encircles is center void that has a sufficient diameter to allow a through wire or support rod 304 to be disposed therethrough. Further, the hook 302 may have a substantially open bend on as second end thereof. The substantially open bend may be greater than 90 degrees but less than 360 degrees. The bend in the second end can be sufficient to allow the second end to act as a hook for holding an animal bed or other article. There can be a plurality of hooks 302, as shown in FIG. 3, for displaying a plurality of products thereon.

Each hook 302 can be removably coupled to the rail structure 106 by a through wire or rod 304. The through rod 304 can pass through the center void created by the 360 degree bend in the hook 302. Further, the through rod 304 can span between the first spacer 210 and the first center member 216 or the second spacer 212 and the second center member 218. There can be a plurality of through rods 304 that can be located at a plurality of locations between the first spacer 210 and the first center member 216 or the second spacer 212 and the second center member 218. For instance, two or more through rods 304 can be vertically spaced from one another for displaying items.

In addition to the plurality of hooks 302, the rail structure 106 may have at least one double hook 306 coupled to the rail structure 106 by a through rod 304. The double hook 306 can be comprised of a wire. The wire may have a substantially open bend 310 on a first end 316 that may be greater than 90 degrees but less than 360 degrees. The open bend 310 may be followed by a substantially straight segment that leads to a 90 degree bend 312. The 90 degree bend 312 can also be followed by a segment of wire that leads to a center circular bend 314. The center circular bend 314 can create a substantially encircled center void for a through rod 304 to pass therethrough. After the center circular bend 314, a series of bends can lead to a second end 318 that is substantially identical to the first end. The double hook 306 can form a hanger system that allows heavier or wider products to be displayed on the rail structure 106 located along the end cap 102.

The rail structure 106 can be coupled to the support member 108 by coupling head members or ends 308. A head 308 can be located on one end of each extension member 202, 204, 206, and 208 and allow the rail structure 106 to be removably coupled to the support member 108. More specifically, the support member 108 may comprise of a structure that has a plurality of openings or notches 114 located in substantially linear alignment with one another. The slots may be appropriately sized to correspond with the coupling head members 308 and allow the coupling head members 308 to be disposed at least partially within the slots of the support member 108. Once the coupling head members 308 are disposed within the slots of the support member 108, the rail structure 106 can be sufficiently coupled to the support member 108 to allow objects to be displayed on the rail structure 106 without the rail structure becoming uncoupled from the support member 108.

Figure 4:
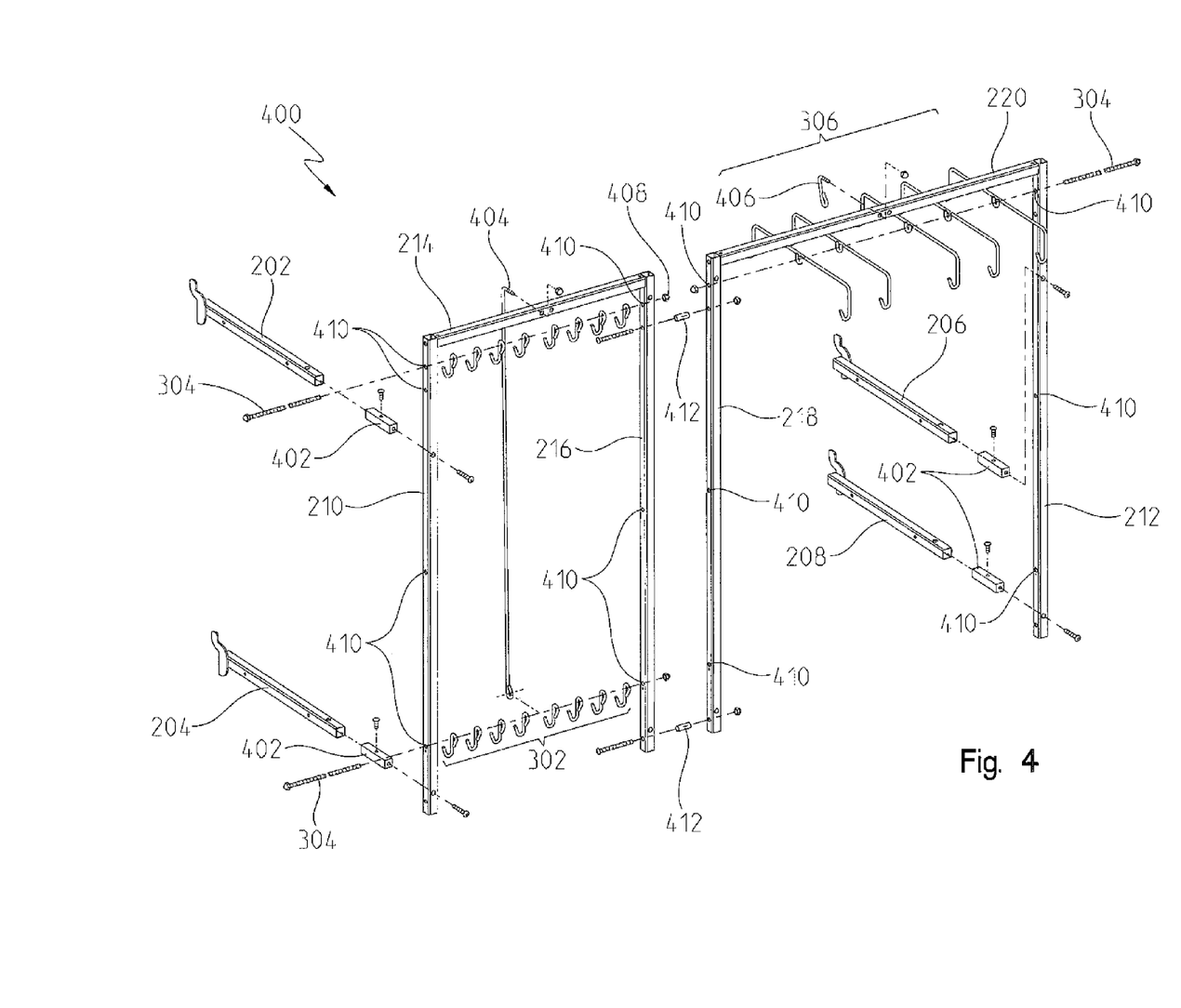
FIG. 4 is a partial exploded perspective view of the rail and hanger system of FIG. 3.
Figure 5:
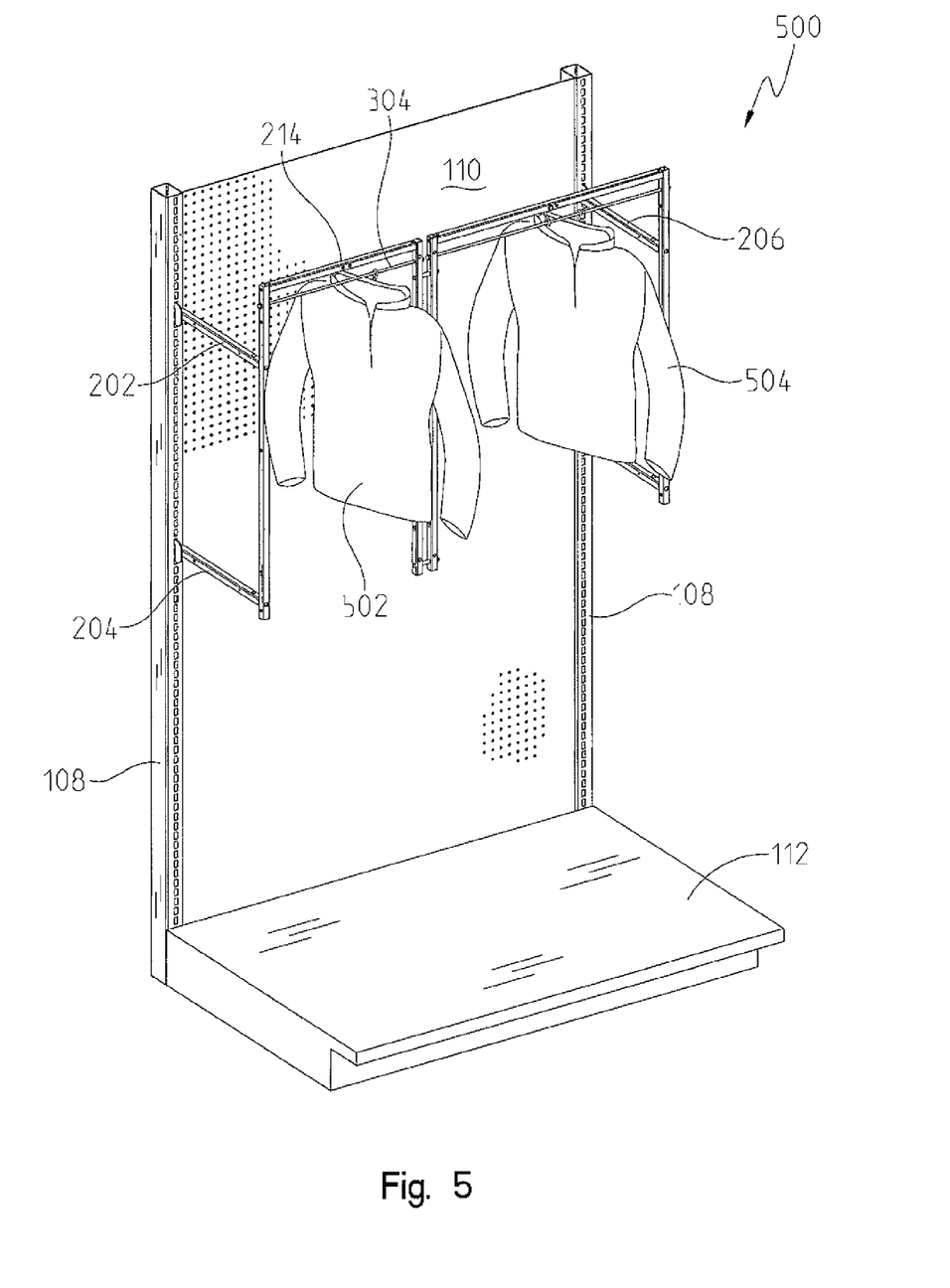
FIG. 5 is a perspective view of another embodiment of an end cap assembly for displaying articles of clothing.

Referring to FIG. 4, an exploded view of one embodiment 400 of the rail structure 106 is shown. More specifically, coupling reinforcement members 402 may be utilized to increase the strength of coupled connections. Coupling reinforcements 402 can be utilized between the extension members 202, 204, 206, and 208 and the first and second spacer 210, 212, The coupling reinforcements 402 can be disposed within an interior opening or space of one end of the extension members 202, 204, 206, and 208. The coupling reinforcements 402 may have a through hole or partial through hole that is perpendicular to a longitudinal axis of the coupling reinforcements 402 and that may align with a corresponding through bole of the extension member 202, 204, 206, or 208. The coupling reinforcement 402 may he inserted into the extension. member 202, 204, 206, or 208 a sufficient distance to axially align the through hole or partial through hole of both the coupling reinforcement 402 and the extension member 202, 204, 206, or 208. When both through holes or partial through holes are axially aligned, the coupling reinforcement 402 and extension member 202, 204, 206, or 208 may be removably coupled to one another by placing a coupling mechanism or fastener into, or through the aligned through hole or partial through hole.

When the coupling reinforcement 402 and extension member 202, 204, 206, or 208 are removably coupled to one another, the coupling reinforcement 402 may be substantially disposed within the extension member 202, 204, 206, or 208, or the coupling reinforcement 402 may be only partially disposed within the extension member 202, 204, 206, or 208. Further, the coupling reinforcement 402 may have a partial longitudinal axial through hole that is exposed on an external face of the coupling reinforcement 402. The partial axial through hole may provide a means for coupling the extension member 202, 204, 206, or 208 to one of the first spacer 210 or the second spacer 212.

The first or second spacer 210, 212 may have through holes that are perpendicular to their longitudinal axis located at either end that allow for a coupling mechanism to fit there through. The coupling mechanism 402 may go through the through hole of the first or second spacer 210, 212 and be coupled to the corresponding coupling reinforcement 402 of one of the extension member 202, 204, 206, or 208. When the coupling reinforcement 402 is located within, and coupled to, one of the extension members 202, 204, 206, or 208, and the first or second spacer 210, 212 are coupled to the coupling reinforcement 402, the coupling reinforcement 402 can maintain a substantially rigid relationship between the components the coupling reinforcement 402 couples.

The exploded view 400 further illustrates how the through rods 304 may be removably coupled to the first or second spacer 210, 212, the hooks 302 or the double hooks 306, and the first or second center member 216, 218. In one embodiment, both the first spacer 210 and the first center member 216 can have through rod through holes 410 located in axial alignment with one another. The through rod through holes 410 may be sufficient in size to allow a through rod 304 to be placed therein. The through rod 304 may have a length that is slightly greater than the external width between the first spacer 210 and the first center member 216. Further, the through rod 304 may be slid through the first spacer 210 through rod through hole 410 and then through the center void of the plurality of hooks 302. Finally, the through rod 304 may slide through the first center member's 216 through rod through hole 410 and be removably coupled in place by an end coupler 408 or fastener.

Similarly, the second spacer 212 and the second center member 218 may also allow for a through rod 304 to pass there through. Instead of coupling hooks 302 to the through rod 304, the second spacer 212 and the second center member 218 may use a through rod 304 to couple the double hooks 306 thereto. Further, all through rods 304 may be substantially parallel to the first and second cross members 214, 220. There may also be a plurality of through rod through holes 410 located along the first and second spacer 210, 212 and the first and second center member 216, 218. The plurality of through rod through holes 410 can allow for a plurality of different locations to removably couple the hooks 302 or the double hooks 306. While hooks 302 and double hooks 306 have been disclosed with particularity, one skilled in the art will understand how a plurality of hanging or coupling mechanisms may be utilized to display objects using the rail structure 106 such as clips, hangers, and the like.

The through rod 304 may also pass through a first reinforcement arm 404 or a second reinforcement arm 406. The first reinforcement arm 404 may be removably coupled to the first cross member 214. The first reinforcement arm 404 may also be coupled to any through rods 304 that may be coupled to the first spacer 210 and the first center member 216. The first reinforcement arm 404 may be coupled to the through rod 304 at any location along the length thereof. The first reinforcement arm 404 can provide additional support to the through rod 304 by substantially transferring any loads on the through rod 304 to the first cross member 214. Further, the first reinforcement arm 404 can be similar in length to the first center member 216 and allow a plurality of through rods 304 to be coupled thereto.

The second reinforcement arm 406 may provide substantially the same support as the first reinforcement arm 404 but has a different length. More particularly, the second reinforcement arm 406 may be coupled to the second cross member 220 on one end and a through rod 304 on the other. The second reinforcement arm 406 may extend only far enough to be coupled to a first through rod 304 that is a relatively short distance away from the second cross member 220. The shorter second reinforcement arm 406 may be beneficial because it will not interfere with any objects that may be coupled to hooks along the through rod 304.

The first and second center members 216, 218 can be spaced apart from one another by at least one center member spacer 412. The center member spacer 412 can be any desirable length and provides that the rail structure 106 substantially aligns with the support member 108. For example, if a first end cap 102 has support members 108 that are different distances from one another than a second end cap 102, the length of the center member spacer 412 may be modified to allow the rail structure 106 to be used with either the first end cap or the second end cap. Further, the center member spacer 412 can be substantially hollow and allow coupling member to be located there through. The first and second center members 216, 218 can also have through holes located at the center member spacer 412. The first and second center member 216, 218 through holes can be axially aligned with the center member spacer 412 to allow a coupling member to hold the first and second center members 216, 218 and the center member spacer 412 in axial and spatial alignment. While one embodiment shows two center member spacers 412 located between the first and second center members 216, 218, any number of center spacers can be used. One skilled in the art will appreciate that a single center member spacer 412 may be adequate to achieve the desired spacing. Further, three or more center member spacers 412 may be utilized to increase the stability and rigidity of the rail structure 106.

Figure 6:
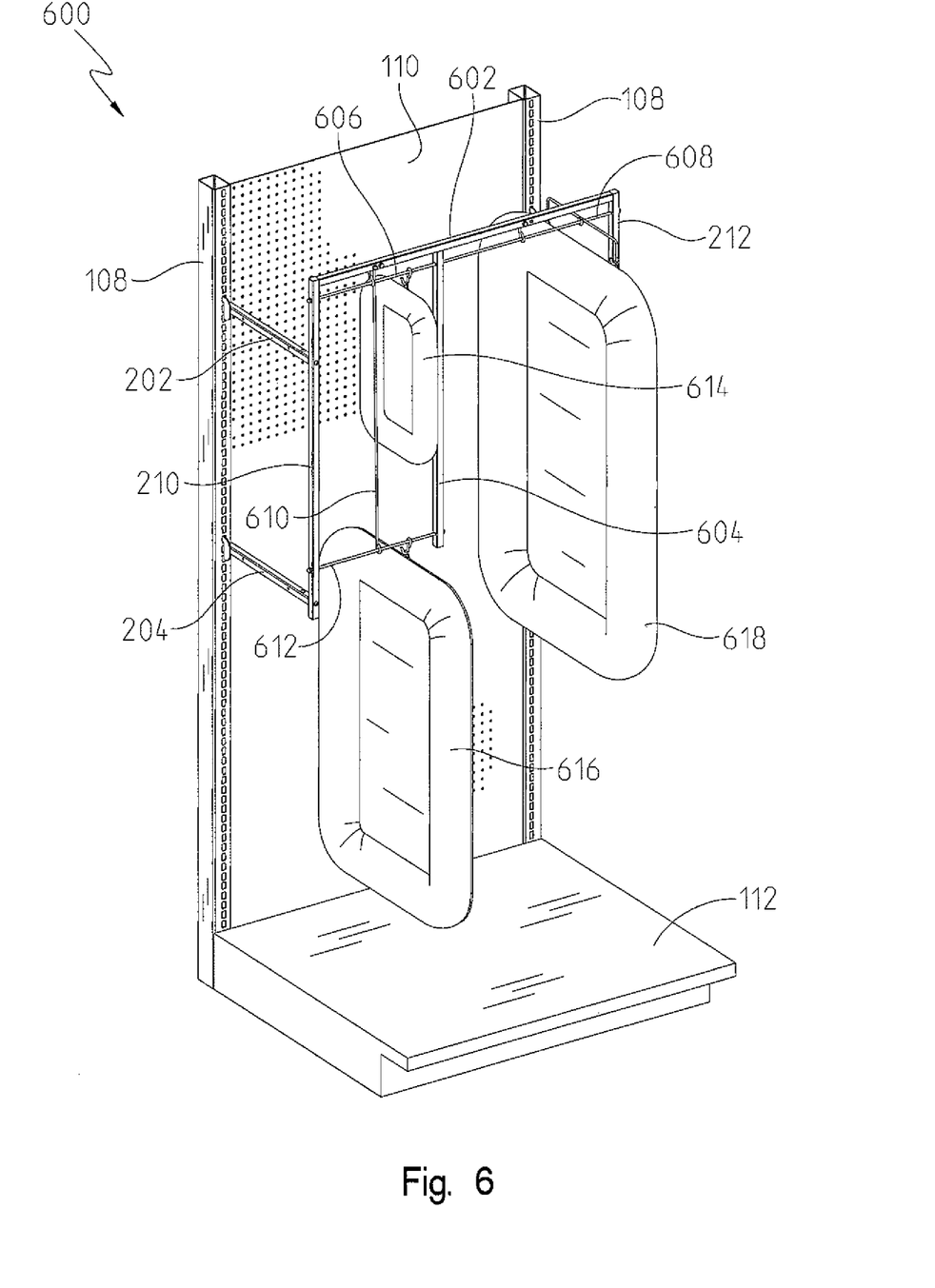
FIG. 6 is a perspective view of a further embodiment of an animal bed display end cap for displaying animal beds.

Referring to FIG. 6, a different embodiment of an end cap assembly 600 is shown. The end cap assembly 600 may include a back member 110, a pair of support members 108 on each side of the back member 110, and a base member 112, as described in previous embodiments. The end cap assembly 600 may further include a rail structure 106 similar to those previously described. For example, the rail structure may include a first extension member 202, a second extension member 204, a third extension member 206, and a fourth extension member 208. Each extension member may be removably coupled to one of the support members 108. As also described above, a first spacer member 210 may be coupled to the first extension member 202 and the second extension member 204. Likewise, a second spacer member 212 may be coupled to the third extension member 206 and the fourth extension member 208.

The end cap assembly 600 of FIG. 6 may be structured to hold various articles of different sizes. For instance, a first animal bed 614, a second animal bed 616, and a third animal bed 618 can be coupled to and displayed by the end cap assembly 600. The first animal bed 614 may be smaller than the second animal bed 616, and the second animal bed 616 may be smaller than the third animal bed 618. In this manner, similar articles of different sizes may be displayed at the same end cap assembly 600, and each may be displayed in a manner that is aesthetically-pleasing to potential buyers. In other words, many pet stores may have animal beds randomly displayed in one or more locations within the store, and in many instances, the display is disorganized and difficult for potential buyers to visually identify the different beds and their respective sizes. The cap assembly 600, however, provides means for displaying the beds in an organized fashion that is pleasing to potential buyers and makes shopping for an animal bed easier compared to most conventional store displays.

The end cap assembly 600 is able to hold articles of varying sizes by including a cross member 602 coupled to the first spacer member 210 and second spacer member 212. The cross member 602 may be coupled to a top portion of each spacer member, as shown in FIG. 6. A center or vertical member 604 may be removably coupled to the cross member 602. The vertical member 604 may also be referred to as an intermediate member that is coupled at any location between the first spacer member 210 and second spacer member 212. If more of the third animal beds 618 are being displayed, the vertical member 604 may be coupled to the cross member 602 at a location closer to the first spacer member 210. Alternatively, if more first and second animal beds are being displayed, then the vertical member 604 may be coupled to the cross member 602 at a location closer to the second spacer member 212. The vertical member 604 may be removably coupled to the cross member 602 at any time so that any number and size of animal beds may be displayed at any given time. The same is true if articles other than animal beds are being displayed by the end cap assembly 600.

A first support rod 606 may be coupled between the first spacer member 210 and the vertical member 604, as shown in FIG. 6. Moreover, a second support rod 608 may be coupled between the second spacer member 212 and the vertical member 604. The first support rod 606 may be coupled between the first spacer member 210 and vertical member 604 at a location beneath the cross member 602. Similarly, the second support rod 608 may be coupled between the second spacer member 212 and vertical member 604 at a location beneath the cross member 602. The first and second support rods may support one or more hooks 302, double hooks 306, or hangers. In other aspects, fasteners or other forms of couplers may be used to couple an article for sale upon either the first support rod 606 or the second support rod 608.

A third support rod 610 may be coupled to the first or second support rod, as shown in FIG. 6. The third support rod 610 may further be coupled at one end to the first or second support rod and at an opposite end to a fourth support rod 612. In this embodiment, the first support rod 606, second support rod 608, and fourth support rod 612 are positioned substantially horizontally, whereas the third support rod 610 is positioned substantially vertically. The fourth support rod 612 may also support a hook 302, double hook 306, hanger, or other mechanism to which an animal bed or other article may be coupled for display.

Figure 7:
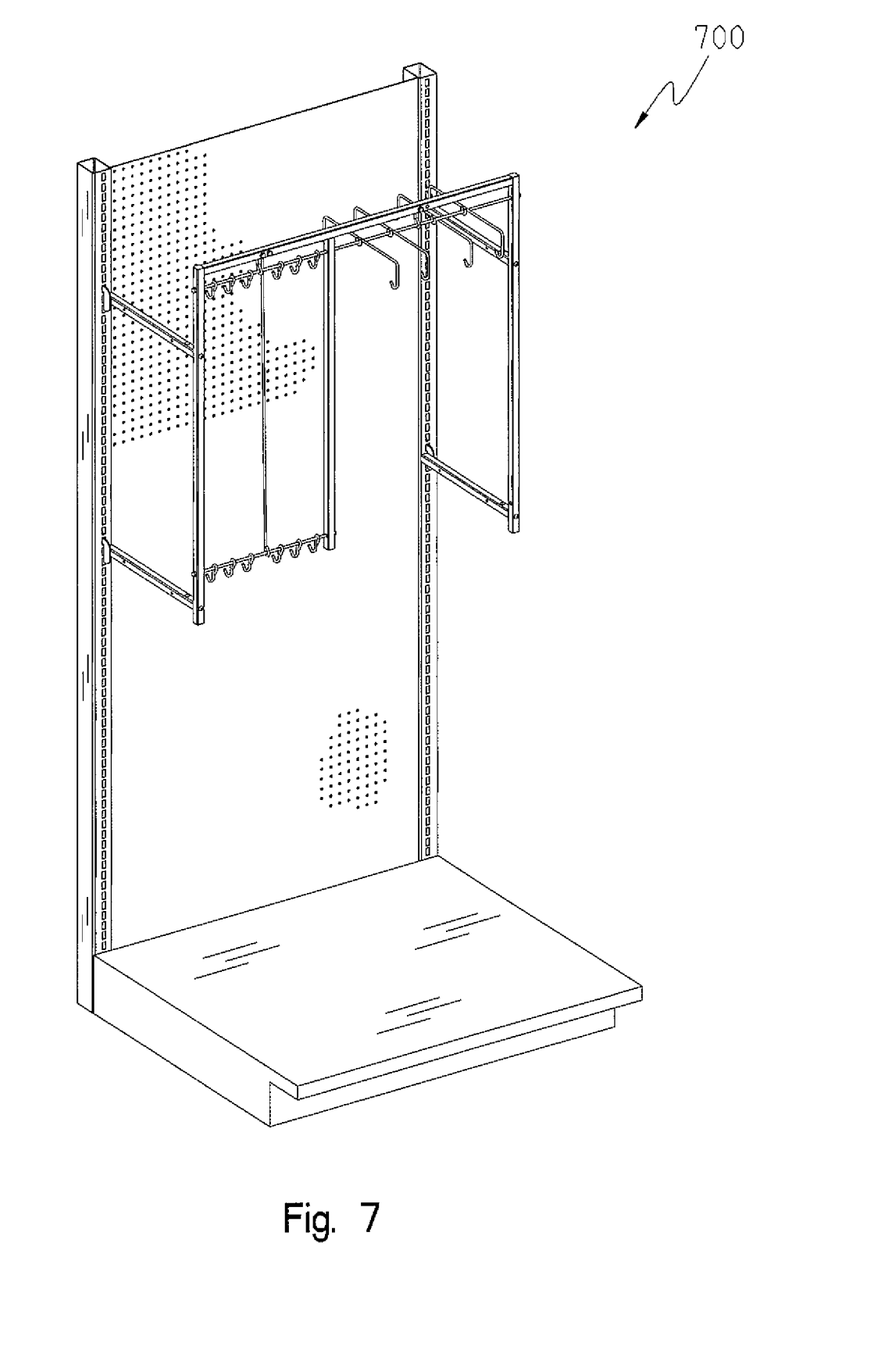
FIG. 7 is another perspective view of the assembly of FIG. 6.

In FIG. 7, a further embodiment 700 is shown of an end cap display 700. In this embodiment, there are no articles of clothing, animal beds, or other items being displayed on the end cap assembly. Many of the aforementioned features may form part of the end cap display 700. This is further shown in the illustrated embodiments of FIGS. 8-9.

Figure 8:
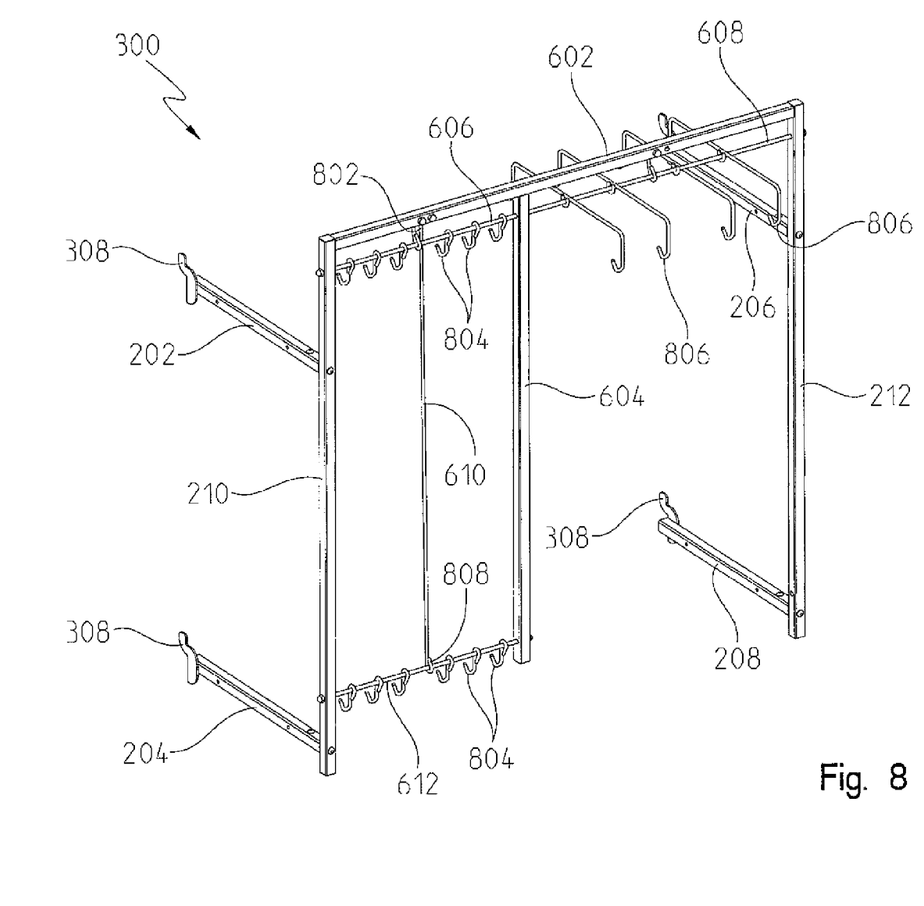
FIG. 8 is a perspective view of a rail and hanger system of the end cap of FIG. 6.

Referring to FIG. 8, a hanger assembly 800 is shown. Here, the hanger assembly 800 may be similar to the rail structure 106 of FIG. 1. The hanger assembly 800 may be structured to hold or support hangers, but it is not intended to be limited to such a function. Hooks, fasteners, eye-loops, and other types of connectors may be coupled to or supported by the hanger assembly 800.

As shown, the third support rod 610 can have a first end 802 and a second end 808. The first end 802 may include a bent end for being receivably engaged by a hole (not shown) defined in the cross member 602. The bent end may include threads to which a fastener may be coupled for coupling the first end 802 of the third support rod 610 to the cross member 602. The bent end may be bent approximately 90° with respect to a main portion of the third support rod 610. Alternatively, the bent end may be bent between 60-120°. In any event, the bent end is formed to releasably engage with the cross member 602.

The second end 808 of the third support rod 610 may have a curled end. The curled end may be wrapped almost entirely to form a loophole therein such that the fourth support rod 612 may be disposed therethrough. While the second end 808 may not have a curled end, it can include a hooked end that is more open than the illustrated curled end. In this way, the hooked end may still support the fourth support rod 612 without forming a loophole such as that formed by the curled end.

In FIG. 8, the hanger assembly 800 is shown supporting a plurality of hooks 804 and hangers 806. The plurality of hangers 806 may include hooked ends as best shown in FIG. 8 such that an animal bed or other article for sale may be coupled thereto. Each hanger 806 therefore forms a double hook similar to that described above.

Figure 9:
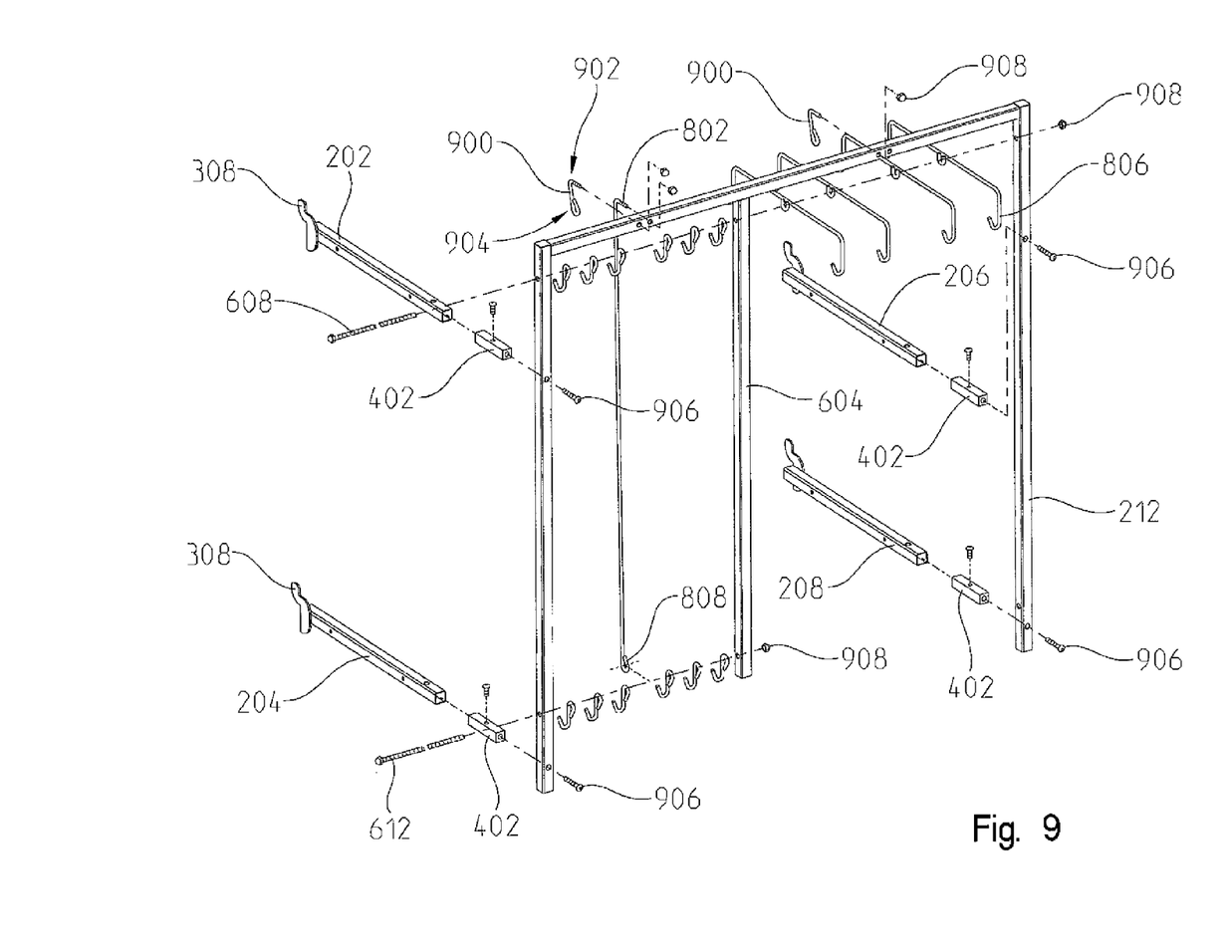
FIG. 9 is a partial exploded perspective view of the rail and hanger system of FIG. 8.

In FIG. 9, a pair of support hooks 900 are shown. Each support hook 900 may include a substantially straight portion 902 and a curled portion 904. A main portion of the hook 900 may be defined between the straight portion 902 and the curled portion 904. The straight portion 902 is shown being bent at an angle with respect to the main portion. The bend may be approximately 90°, but in other embodiments it may be more or less than 90°. In any event, the straight portion 902 may be received within a hole or opening defined in the cross member 602 similar to that described above with respect to the third support rod 610. At the other end, the curled portion 904 may define a loophole through which the first or second support rod may pass through.

In the embodiment of FIG. 9, one support hook 902 may be coupled to the cross member 602 at a location between the first spacer member 210 and the vertical member 604, and another support hook 902 may be coupled to the cross member 602 at a location between the vertical member 604 and the second spacer member 212. Additional support hooks 902 may be coupled to the cross member 602. For instance, if heavier articles are being displayed and hung by the hanger assembly 800, additional support hooks 902 may be necessary to further support the first support rod 606 and the second support rod 608.

As also described above and shown in FIG. 9, various fasteners 906, 908 may be used to further couple the support rods, extension members, etc. to the hanger assembly 800 and end cap assembly 600.

Figure 10:
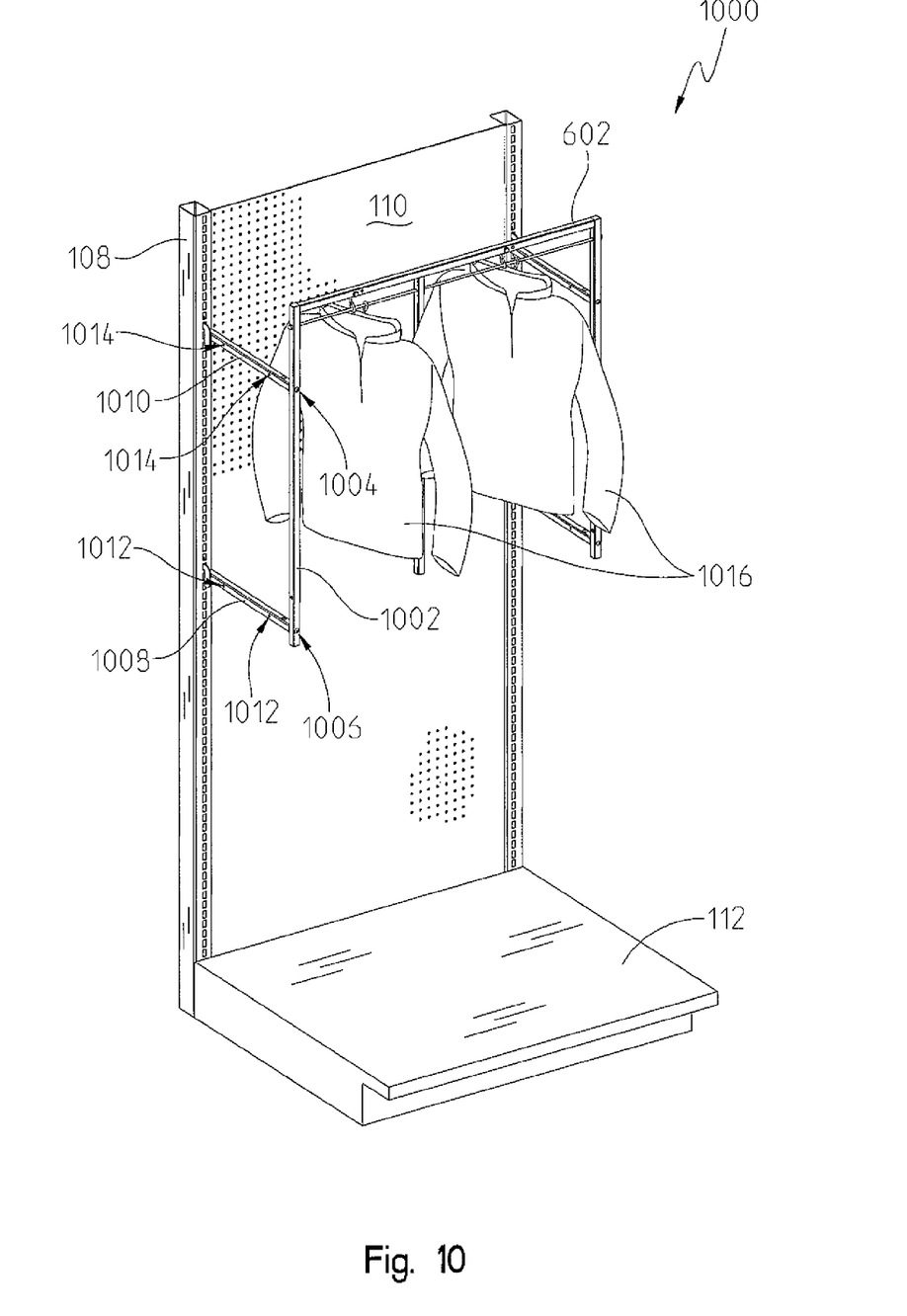
FIG. 10 is a perspective view of a different embodiment of an end cap assembly for displaying articles of clothing.

Referring to FIG. 10, a different embodiment of an end cap assembly 1000 is shown. Here, the end cap assembly 1000 includes a back member 110, a base member 112, and a pair of support members 108. The end cap assembly 1000 further includes a first member 1002, a second member 1008, and a third member 1010. The first member 1002, second member 1008, third member 101Q and at least a portion of the support member 108 forms a parallelogram-like structure at one side of the end cap assembly 1000. A similar structure may be provided at the other side of the end cap assembly 1000.

As also shown, a first opening 1004 and a second opening 1006 may be defined in at least two locations of the first member 1002. Fasteners (not shown) may be used for coupling the first member 1002 to the second member 1008 and third member 1010. The second member 1008 may also include one or more defined openings 1012, and the third member 1010 may include one or more defined openings 1014. The plurality of openings 1014 may allow for the second support rod 606 or third support rod 608 to be coupled to the third member 1010. Similarly, the plurality of openings 1012 defined in the second member 1008 may allow for the fourth support rod 612 to be coupled to the second member 1008. As further shown, one or more articles 1016 may be supported by the end cap assembly 1000.

Various embodiments of an end cap assembly have been shown and described herein. In a related embodiment, each of the aforementioned assemblies may be provided as a kit. Thus, depending on the type of articles being displayed by the end cap assembly, each kit may include various members for displaying any number or size of articles. Moreover, each kit may include a plurality of hooks, double hooks, hangers, connectors, rods, etc.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claim.

The invention claimed is:

1. An end cap assembly, comprising:
   a base member adapted to rest on a floor surface;
   a back member including a height and a width;
   a first support member and a second support member coupled to the back member, the first support member disposed at one side of the back member and the second support member disposed at an opposite side thereof;
   a plurality of extension members removably coupled to the first and second support members;
   a first spacer member and a second spacer member, the first spacer member being coupled to at least two of the plurality of extension members and the second spacer member being coupled to at least two other of the plurality of extension members, wherein the first spacer member and the second spacer member are spaced a distance apart;
   a cross member having a first end and a second end, wherein the first end is coupled to one of the first or second spacer members;
   an intermediate member coupled to the cross member at the second end of the cross member, the intermediate member being disposed between the first and second spacer members and being substantially parallel to the first and second spacer members;
   at least one support rod coupled to the intermediate member and to one of the first spacer member and second spacer member; and
   a plurality of couplers coupled to the at least one support rod, wherein the plurality of couplers are configured to support one or more articles for display on the end cap assembly.

2. The end cap assembly of claim 1, wherein each of the plurality of extension members includes a first end and a second end, the first end being coupled to either the first spacer member or second spacer member, and the second end including a coupler end for coupling to the first support member or the second support member.

3. The end cap assembly of claim 1, wherein the first and second support members comprise a plurality of openings defined along their respective lengths, where each of the plurality of extension members are coupled to the first or second support member via at least one of the plurality of openings.

4. The end cap assembly of claim 1, wherein the first support member and the second support member each include a longitudinally defined groove for receiving the back member.

5. The end cap assembly of claim 1, further comprising a second intermediate member, a second cross member, and a second support rod;
wherein, the second cross member is coupled between the second intermediate member and the second spacer member, and the second support rod is coupled between the second intermediate member and the second spacer member at a location beneath the second cross member.

6. The end cap assembly of claim 5, wherein the first spacer member, the second spacer member, the intermediate member and and the second intermediate member are coplanar with one another.

7. The end cap assembly of claim 5, further comprising a member spacer wherein the member spacer is coupled to the intermediate member and to second intermediate member.

8. The end cap assembly of claim 7, wherein the member spacer includes a first member spacer located toward first ends of the intermediate member and the second intermediate spacer, and a second member spacer located toward second ends of the first intermediate spacer and the second intermediate spacer.

9. The end cap assembly of claim 5, wherein support of the first intermediate member and the second intermediate member is provided solely by being coupled to the first intermediate member, the second intermediate member, and a member spacer.

10. The end cap assembly of claim 1, further comprising a plurality of reinforcement members, wherein each of the plurality of reinforcement members is disposed within one end of each of the plurality of extension members.

11. The end cap assembly of claim 1, wherein the plurality of extension members comprises a first extension member, a second extension member, a third extension member, and a fourth extension member;
further wherein:
the first extension member and the second extension member are spaced from one another and coupled to the first support member and the first spacer member to form a first four-sided rail structure; and
the third extension member and the fourth extension member are spaced from one another and coupled to the second support member and the second spacer member to form a second four-sided rail structure.

12. The end cap assembly of claim 1, wherein the plurality of couplers each comprises a hook, hanger, or double hook.

13. The end cap assembly of claim 1, wherein the first spacer member, the second spacer member, and the intermediate member are coplanar with one another.

14. The end cap assembly of claim 1, wherein the at least one support rod is substantially parallel to the intermediate member.

15. The end cap assembly of claim 1, wherein the extension members include a length sufficient to displace the spacer members from the back member.

16. The end cap assembly of claim 15, wherein each of the extension members extends outwardly from one of the first support member and the second support member to define a display space between the back member and the first support member and between the back member and the second support member, wherein the display space is sufficient to locate at least a portion of the one or more articles for display.

* * * * *